C. E. KEEL.
VARIABLE SPEED GEARING.
APPLICATION FILED JUNE 23, 1911.

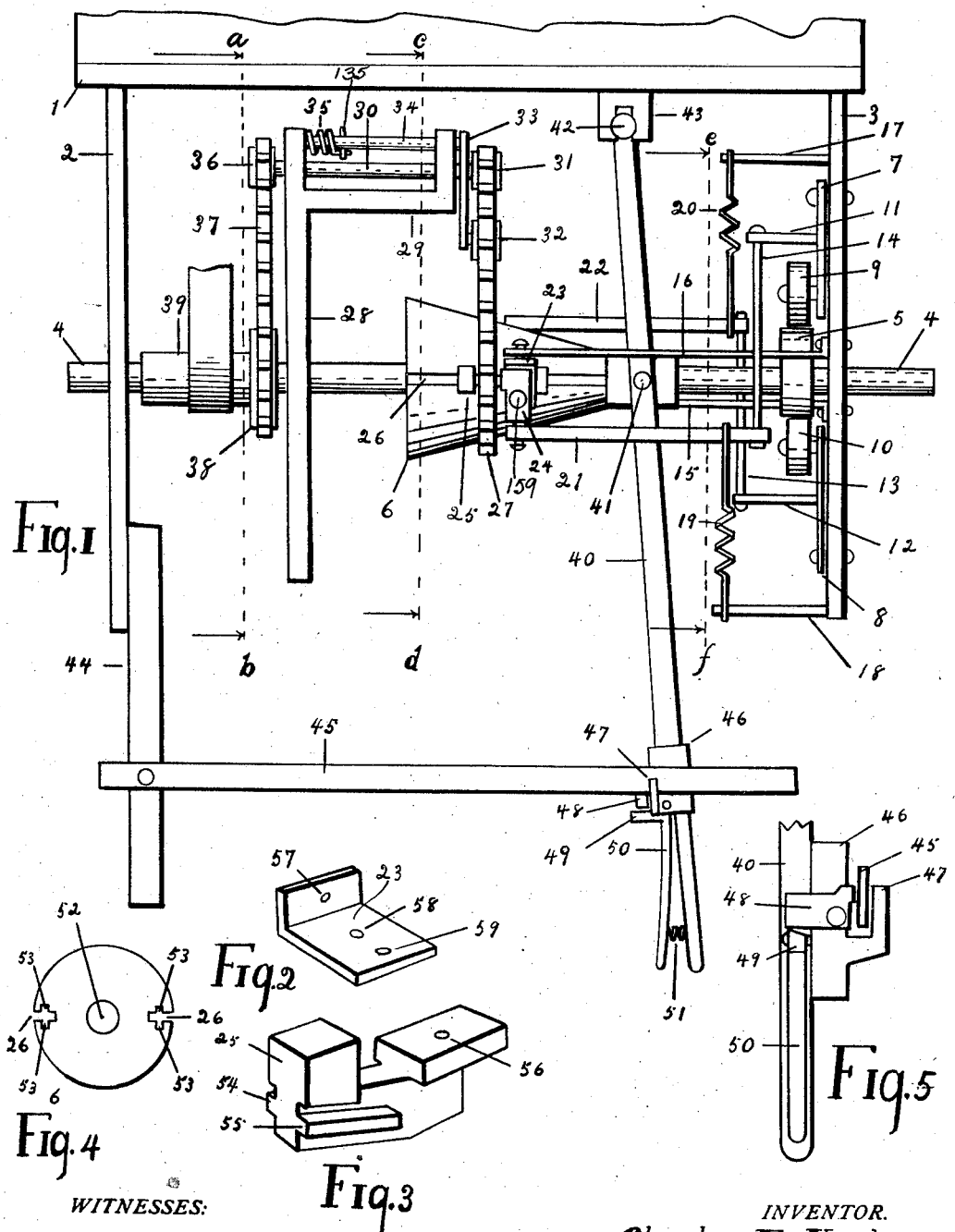

1,025,807.

Patented May 7, 1912.

2 SHEETS—SHEET 2.

WITNESSES:
O. M. McLaughlin
E. H. Mayo

INVENTOR.
Charles E. Keel.
BY
V. H. Lockwood
ATTORNEY.

COLUMBIA PLANOGRAPH CO., WASHINGTON, D. C.

UNITED STATES PATENT OFFICE.

CHARLES E. KEEL, OF INDIANAPOLIS, INDIANA.

VARIABLE-SPEED GEARING.

1,025,807.   Specification of Letters Patent.   Patented May 7, 1912.

Application filed June 23, 1911. Serial No. 634,870.

*To all whom it may concern:*

Be it known that I, CHARLES E. KEEL, a citizen of the United States, and a resident of Indianapolis, county of Marion, and State of Indiana, have invented a certain useful Variable-Speed Gearing; and I do hereby declare that the following is a full, clear, and exact description thereof, reference being had to the accompanying drawings.

The object of this invention is to provide an improved speed changing and reversing mechanism, whereby the ratio of the speed of the driving element to that of the driven element may be varied at will and the driven member be driven in either a forward or a reverse direction.

The features of the invention lie in providing a driving member with a non-rotating member, preferably an arm secured to said driving member having a secondary shaft thereon and revoluble therewith about said non-rotating member, and a driven member loosely mounted on the driving member with flexible gearing between the secondary shaft and the driven member, and between the non-rotating member and said secondary shaft.

The nature of the invention will be understood from the accompanying drawings and the following description and claims.

Figure 6:
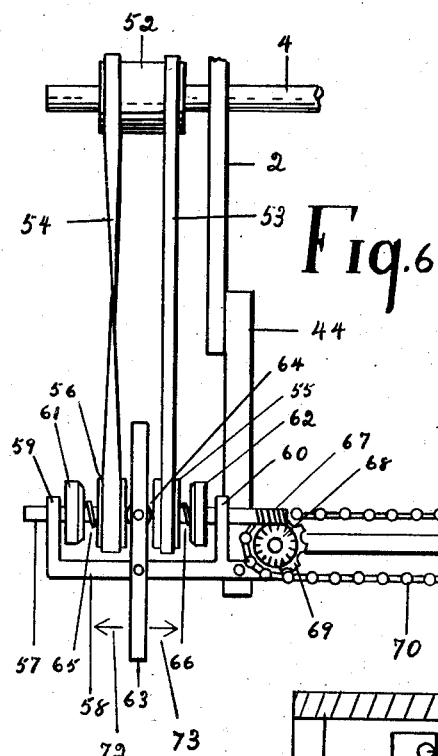
Figure 9:
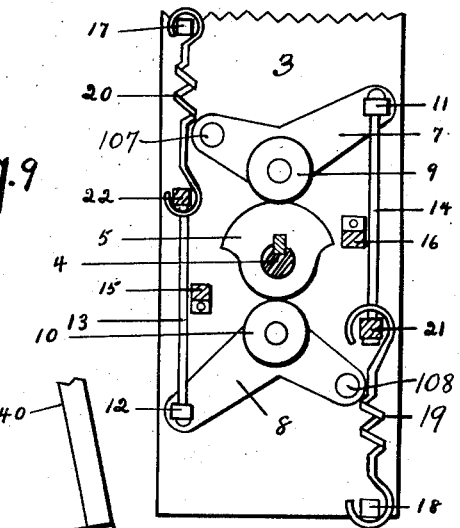
Figure 7:
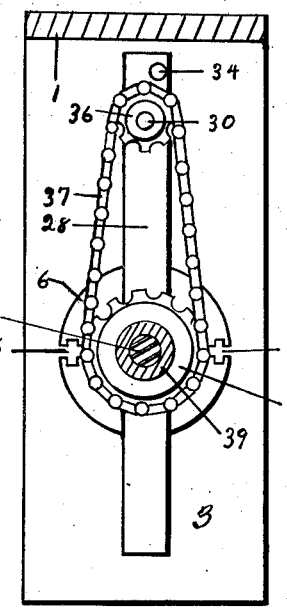
Figure 8:
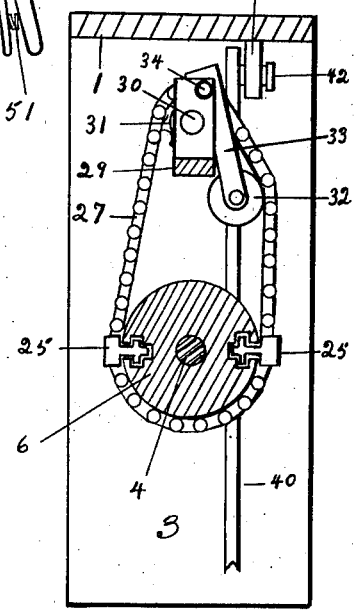

In the drawings Figure 1 is a side elevation of the device. Figs. 2, 3 and 4 are details of the jaw bars and the end of the sliding cone. Fig. 5 is an enlarged view of the end of the shift lever shown in Fig. 1. Fig. 6 shows a modification of the operating lever here shown as being operated by power. Fig. 7 is a vertical transverse section on the line *a—b* of Fig. 1. Fig. 8 is a vertical transverse section on the line *c—d* of Fig. 1. Fig. 9 is a transverse section on the line *e—f* of Fig. 1.

In detail there is shown a frame 1 mounted on some stationary support and having end members 2 and 3 which support a shaft 4 driven from some convenient source of power. A cam 5, keyed on the shaft 4, is adapted to move against rollers on levers 7 and 8 pivoted at 107 and 108, respectively, to the side bar 3 of the main frame. Bars 11 and 12 on the levers 7 and 8 extending at right angles therefrom have connecting rods 13 and 14 pivoted at their ends and at the other ends of said connecting rods bars 21 and 22 are pivoted whose ends are secured to jaw blocks 24 of the chain clutch mechanism to be described later. A cone member 6 having bearing on the shaft 4, but being prevented from rotation by means hereafter described, has an extending end, cylindrically-shaped, and in the tapered sides there are Greek cross-shaped slots 26 diametrically opposite each other and adapted to receive the sliding jaw members 25 which move therein. Said sliding members are each of irregular shape with an outwardly projecting portion 54 and 55 on either side adapted to fit in the inwardly cut grooves 53 of the slot 26 in the cone and a projection sliding on the exterior of the cone to form one of two jaw members to grip the chain 27. On the right-hand end of each sliding jaw, as shown in Fig. 3, a flat portion at right angles to the lower portion which slides in the groove 26, is adapted to be pivoted to an angle bar 23, see Fig. 2, by bolts extending through the holes 56 and 58 in said members 23 and 25 and through the hole 59 in said member 23 and the hole 159 in the jaw block 24 a second pivot is inserted. Thus the jaw block 24 and the angle plate 23 have a pivotal movement independent of the angle block 23 and the sliding jaw member 25. On the side bar 3 of the frame, brackets 15 and 16 are pivoted and support the angle blocks 23 by screws through the holes 57 in said blocks. Thus it will be seen, as before mentioned, that while the cone 6 bears on the shaft 4, the sliding blocks 25 being secured to the angle blocks 23 and these being fastened to the extending brackets 15 and 16, the cone 6 will be prevented from rotating. A further preventative against rotation of the cone is obtained by pivoting the extending neck of said cone to a shift rod 40 by means to be described later. The extending brackets 15 and 16 also prevent the sliding jaw members 24 and 25 from moving in either direction on the cone.

Rigidly secured to the shaft 4 a bracket 28 is mounted having a yoke-shaped end affording bearings for a shaft 30 with sprocket wheels 31 and 36 splined on the projecting ends thereof. A second shaft 34 also has bearing in said yoke member, but only one end thereof projects through the said yoke member and has an arm 33 secured thereon which has an idler 32 pivoted on its outer end. The chain 27, before mentioned, extends around the periphery of the cone 6 and over the sprocket 31 on the shaft 30 and is held in tension by said idler 32 which is caused to bear out against the chain 27 by a spring 35 surrounding the shaft 34 and having one end secured to the yoke member and the other end bearing against a pin 135 extending through said shaft 34. Thus, while the shaft 30 has a rotating movement, the shaft 34 only has an oscillatory movement sufficient that the chain 27 will always be kept in tension. Mounted on the shaft 4, but rotating freely thereon, a sleeve or small pulley 39 having at one end a sprocket wheel 38 is adapted to be driven by the chain 37 from the sprocket wheel 36 on the shaft 30. Although a sleeve has been shown as the driven means, any other suitable means might be substituted therefor.

The cone member 6 is adapted to be slidably moved along the shaft 4 by means of the shift lever 40 which, as before said, is pivoted to the neck portion of the cone by the pivot 41 and the upper end of the shift lever is pivoted in a bracket 43 on the pivot 42 which may have a vertical movement to allow said lever 40 to be moved from one side to the other. The lower end of the shift lever 40 is provided with a clutch mechanism which engages a horizontal rod 45 pivoted at one end to a fixed support 44, whereby after being set in any desired position, the shift lever will be held in that position. At the lower end of the shift lever 40 a member 46 is secured which has an outward and upwardly projecting finger 47 providing a slot in which the horizontal rod 45 may slide. Pivoted to the member 46 a spring actuated auxiliary handle is secured which has a projecting finger 49 adapted to bear against a jaw member 48 also pivoted to the member 46 and when said auxiliary handle is released the spring 51 will force it outward and the projecting finger 49 will bear against the jaw member 48, turning it about its pivot and locking the sliding rod 45 against the projecting finger 47 of the clutch member and thus prevent the sliding movement on the part of either.

It will be seen that by depressing the auxiliary handle 50, the shift rod 40 may be moved to the right or to the left, thus moving the cone member 6 along the shaft 4 and the sliding jaw members 25 and since the jaw members 24 and 25 are pivotally secured to the end member 3, said jaw members will move toward or away from the shaft 4, as the case may be, and permit the cone to be moved as described. The chain 27 will occupy positions on the cone whose diameters will vary and thus the diametric relation between the driven sprocket wheel 38 and that of the cone member will vary also and thus the speed ratio between the two may be varied at will by changing this diametric relation.

While in the drawings only one idler 32 has been shown, and only two chain clamping blocks and two cam operated levers have been shown, the device is capable of modification and I do not wish to be limited to these particular constructions, for two idlers could be used in the place of one and a plurality of chain clamping blocks could be used in the place of these two with a corresponding number of levers.

A further modification of my invention permits the shift lever 40 to be operated by power from the main shaft. A pulley 52, mounted on an extension of the shaft 4, is adapted to drive a second pulley 55 on the shaft 57 by an open belt 53 and a third pulley 56 also mounted on the shaft 57 but driven by a crossed belt 54. The shaft 57 is mounted in bearings 59 and 60 in the frame 58 secured to a support 44 from the main frame and is provided with a worm 67 adapted to drive a worm gear 68 and a sprocket wheel 69 on the same shaft. On the opposite end of the bar 45 a second sprocket wheel 71 is pivoted and a chain 70 rides on and connects the sprocket wheels 69 and 71. The clutching mechanism on the shift lever has its clamping finger 48 so adjusted that it will protrude through or clamp said chain 70 against the projection 47 of the clutch member instead of clamping the rod 45 against the clutch member 47, as heretofore described.

Friction disks 61 and 62 are mounted on the shaft 57 adjacent to the pulleys 55 and 56 in such position that when the pulley 55 or 56 is moved by the hand lever 63 against one of said friction disks, the shaft 57 will be driven by one of said pulleys and the worm gear 68 caused to revolve, thereby causing a movement of the sprocket wheel 69 and chain 70. Thus the shift lever 40 will be moved to the right or to the left according to whether the hand lever 63 has been moved to the right or to the left. The friction disks 61 and 62 are not necessarily a part of this invention. Any known construction may be used, such that when the lever 63 is moved to its normal position, springs such as 65 and 66 will throw the friction disks from engagement with the pulleys.

Referring again to the cam 5, it will be seen that the actuating or enlarged portion extends for substantially one half of the perimeter thereof and actuates the levers 7 and 8 alternately, actuating one as it ceases to actuate the other. After being actuated to operate the jaws 24 the levers are returned to their normal position by the action of the coil springs 19 and 20 secured to projections 17 and 18 from the side bar 3 and to the bars 21 and 22, respectively. These springs also serve to retire the clutching members 24 from their active to their idle positions.

To operate my invention power from any convenient source is applied to the shaft 4 to cause its rotation which will cause an alternate action and release of the lever rollers by the cam 5, causing in turn, through the connections 14, 21, 24 and 25, and 13, 22, 24 and 25, an alternate clamping and releasing of the chain 27 on the periphery of the cone 6. The rotation of the shaft 4 will cause the revolution of the bracket 28 carrying the shaft 30 and with the shift lever 40 moved to such a position that the diameter of the cone 6 where the chain bears is either larger or smaller than that of the sprocket wheel 38, a turning movement of said sprocket wheel and of the sleeve 39 will be caused and power will be transmitted to it. The cam 5 is so timed that the chain 27 is clamped by one pair of the clamping jaws 24 and 25 just after the chain has wound onto the cone and is released by the other pair of said clamping jaws just previous to the point where the chain 27 leaves the cone 6. Should the diameter of the cone at the bearing point be the same as that of the driven sprocket 38, said driven sprocket will not revolve, that is, no power will be transmitted to it from the driving shaft.

It is obvious that the cone 6 may be so constructed that this idle position may be anywhere on the cone. Fig. 1 shows said idle position about midway of the length of the cone. Supposing that the chain located at the left of the idle position will drive the driven shaft in a clockwise or forward direction, it is also obvious that the speed of said driven shaft can be made to decrease from a maximum to zero by moving the shift lever from the extreme left to the right to said idle position and it is also obvious that a further movement of said shift lever to the right will reverse the direction of rotation of the driven shaft to a counter-clockwise direction. This reversed speed will increase from zero at the idle position to a maximum with the shift lever at the extreme right-hand position. The changes of speed by this invention cannot be made suddenly in a way to injure the driving motor and the change from a forward to a reverse drive is also accomplished gradually and without jar to the driving motor.

I do not wish to be limited to the particular construction shown herein as it will be evident to anyone skilled in the art that any one of several well-known means may be substituted for my secondary shaft and other flexible connection than a chain may also be used as well as any other form of driven member than the one shown.

I claim as my invention:

1. The combination with a driving shaft, of a driven member coaxial with said driving shaft, a secondary shaft parallel with the driving shaft and geared with said driven member, a frame carrying said secondary shaft and secured on and revolved by the driving shaft, a non-rotative cone coaxial with the driving shaft and slidable thereon, a chain engaging said cone and geared with said secondary shaft, means for preventing the slippage of said chain on said cone, and spring actuated means carried by said revolving frame for tightening the chain.

2. The combination with a driving shaft, of a driven member coaxial with said driving shaft, a secondary shaft parallel with the driving shaft and geared with said driven member, means carrying said secondary shaft secured on and revolved by the driving shaft, a non-rotative cone coaxial with the driving shaft and slidable thereon, a chain engaging said cone and geared with said secondary shaft, means connected with said cone on the periphery thereof for engaging the chain and preventing the slippage of the cone, and means actuated by the shaft for alternately operating said chain holding means on the cone.

3. The combination with a driving shaft, of a driven member mounted coaxially therewith, a frame secured on said driving shaft so as to revolve therewith, a secondary shaft mounted on the outer end of said frame parallel with the driving shaft, means for gearing said secondary shaft with the driven member, a non-rotary cone coaxial with the driving shaft which has a plurality of dovetailed grooves extending longitudinally thereof and spaced apart, a chain engaging the cone and geared with said secondary shaft, means for longitudinally shifting the cone, means mounted and slidable in each of the cone grooves for gripping said chain, a cam on the driving shaft, and means actuated by said cam for alternately operating said chain gripping means.

4. The combination with a driving shaft, of a driven member mounted coaxially therewith, a frame secured on said driving shaft so as to revolve therewith, a secondary shaft mounted on the outer end of said frame parallel with the driving shaft, means for gearing said secondary shaft with the driven member, a non-rotary cone coaxial with the driving shaft which has a plurality of dovetailed grooves extending longitudinally thereof and spaced apart, a chain engaging the cone and geared with said secondary shaft, means for longitudinally shifting the cone, a block slidable in each of said cone grooves having on one side of the chain a fixed jaw, a movable jaw pivotally mounted on the other side of the chain so as to coöperate with the fixed jaw in gripping the chain, a cam on the driving shaft, and means actuated by the cam for alternately actuating the movable jaws.

5. The combination with a driving shaft, of a driven member mounted coaxially therewith, a frame secured on said driving shaft so as to revolve therewith, a secondary shaft mounted on the outer end of said frame parallel with the driving shaft, means for gearing said secondary shaft with the driven member, a non-rotary cone coaxial with the driving shaft and which has a plurality of dove-tailed grooves extending longitudinally thereof and spaced apart, a chain engaging the cone and geared with said secondary shaft, means for longitudinally shifting the cone, a block slidable in each of said cone grooves having on one side of the chain a fixed jaw, a movable jaw pivotally mounted on the other side of the chain so as to coöperate with the fixed jaw in gripping the chain, a cam on the driving shaft, a lever fulcrumed on each side of said cam and adapted to be engaged by the cam between the ends thereof, means connecting the free ends of said levers with said movable jaws, and springs for holding said levers against the cam.

In witness whereof, I have hereunto affixed my signature in the presence of the witnesses herein named.

CHARLES E. KEEL.

Witnesses:
E. H. MAYO,
O. M. McLAUGHLIN.

---

Copies of this patent may be obtained for five cents each, by addressing the " Commissioner of Patents, Washington, D. C."